Sept. 28, 1965  C. M. WRENSHALL  3,208,174
ILLUMINATION DEVICES
Filed April 5, 1962  4 Sheets-Sheet 1
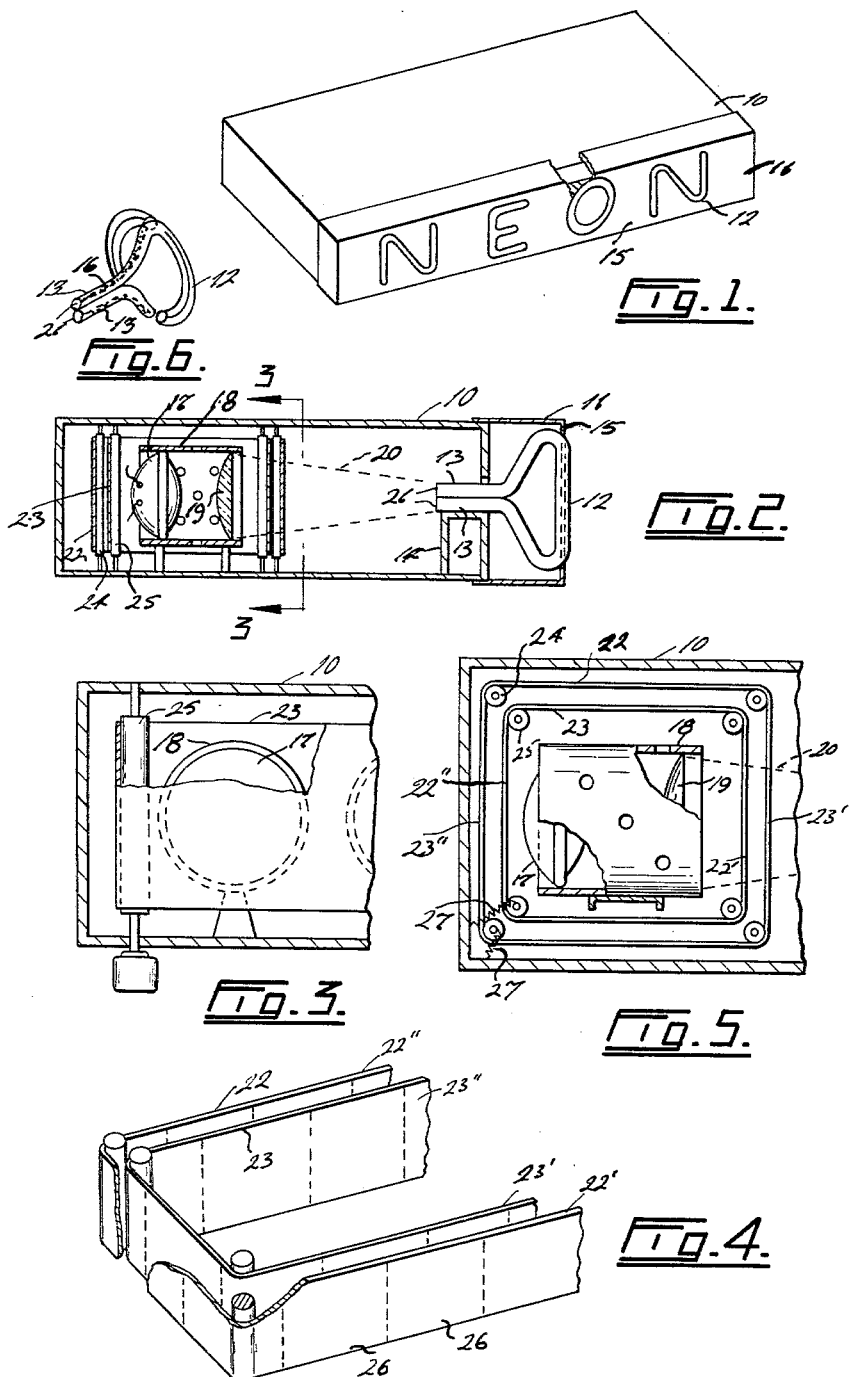

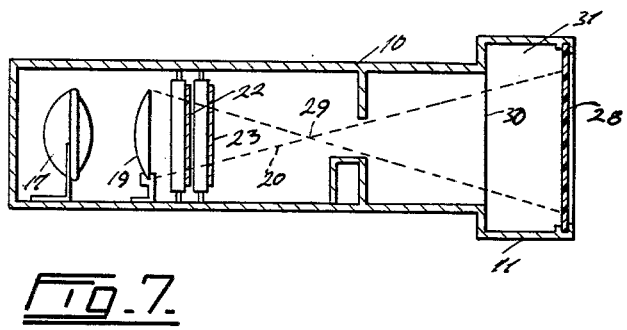
Fig. 7.
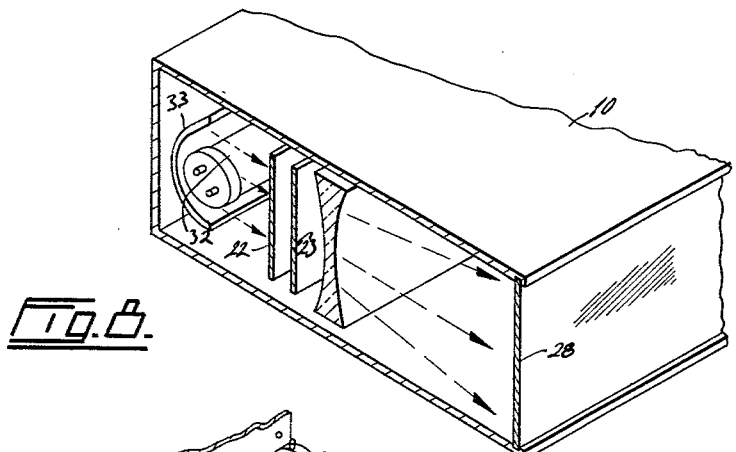
Fig. 8.
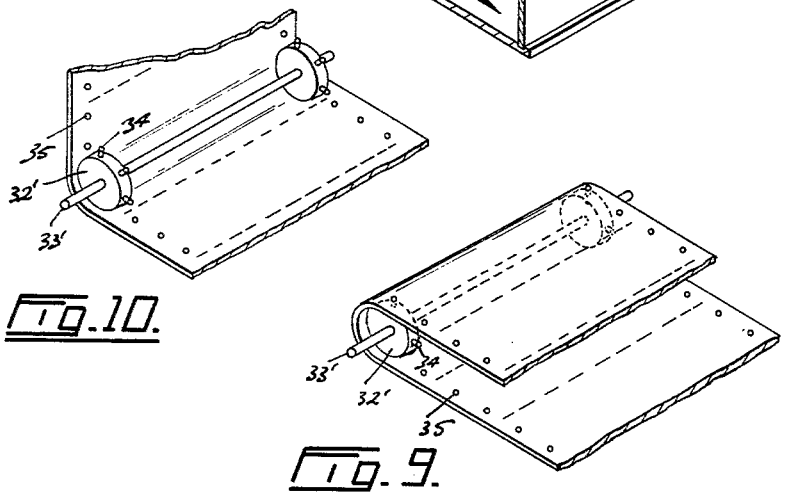
Fig. 10.
Fig. 9.

Sept. 28, 1965 C. M. WRENSHALL 3,208,174
ILLUMINATION DEVICES
Filed April 5, 1962 4 Sheets-Sheet 3
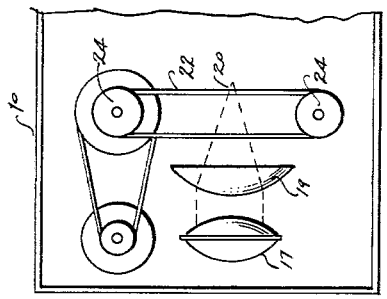
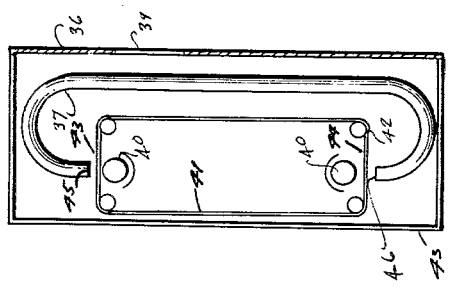
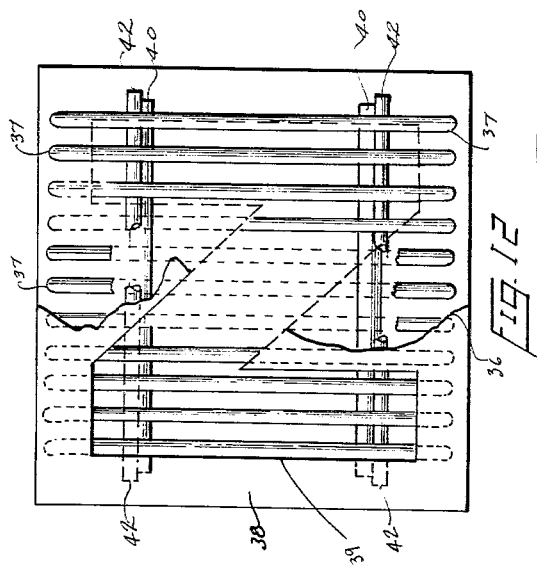
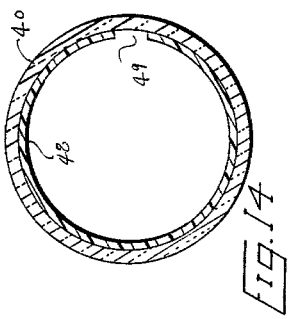
INVENTOR.
CHARLES M WRENSHALL
HIS ATTY.

Sept. 28, 1965     C. M. WRENSHALL     3,208,174
ILLUMINATION DEVICES
Filed April 5, 1962     4 Sheets-Sheet 4
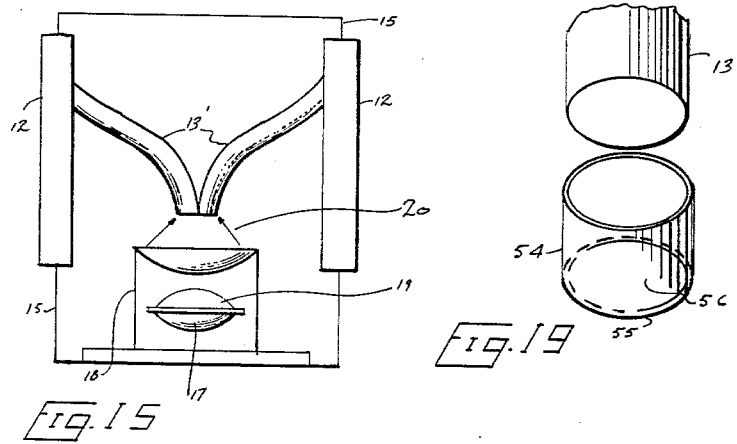
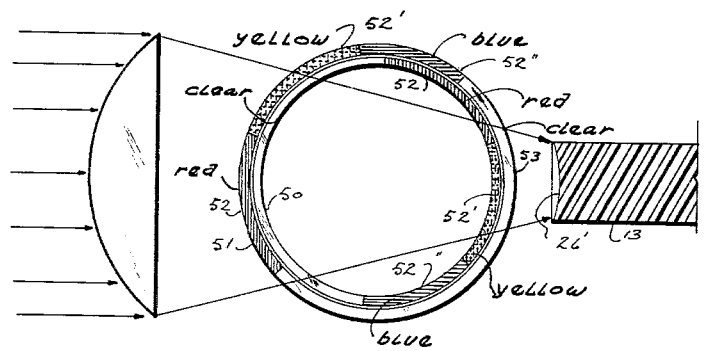
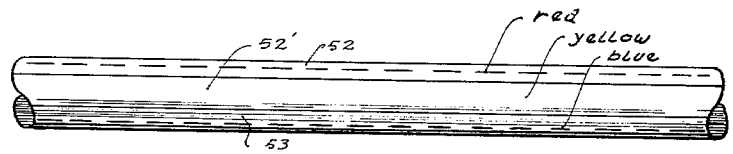
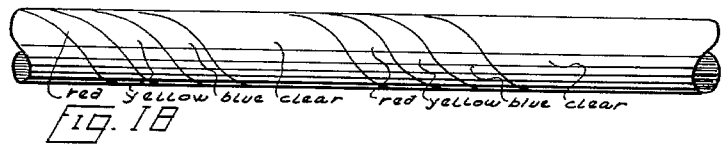

United States Patent Office 3,208,174
Patented Sept. 28, 1965

3,208,174
ILLUMINATION DEVICES
Charles M. Wrenshall, 3408 7th SW., Calgary,
Alberta, Canada
Filed Apr. 5, 1962, Ser. No. 185,471
1 Claim. (Cl. 40—130)

My invention relates to new and useful improvements in illuminated signs and is an extension of and an improvement to my United States patent application, Serial No. 56,184, filed September 15, 1960.

In the above mentioned applications, I disclose a method of producing infinitely variable coloured light by means of a light source shining through a plurality of transparent discs segmented into various colours and placed one behind the other, said discs rotating at different speeds.

The present device contemplates a light source shining through a plurality of transparent belts or cylinders divided into different coloured areas, said belts or cylinders travelling at slightly different speeds or the same speed, but in opposite directions, so that the infinite variation of colour is once again produced.

The invention is further improved by the focusing of the light after it passes through the transparent belts or cylinders, onto the ends or tips of acrylic plastic rods which are formed in various shapes and which have the well known light-pipe property, so that the shape formed by the acrylic rods is itself illuminated by an infinitely variable colour.

This effect, similar in visual appearance to "neon" lighting, has the following advantages over neon.

(1) Because high voltage is not used, there is no radio or television interference.
(2) No breakage or replacement due to storms, vandalism, or children, as in the case of neon. The acrylic rod is virtually indestructible.
(3) No high frequency current with its occupational and industrial hazards.
(4) Modular construction, almost imposible with neon.
(5) Less static attraction for dust, and therefore easier to keep clean.
(6) Colours can vary or one static colour.

A further advancement over the above identified patent application includes the use of the infinitely variable coloured light produced by the plurality of belts or cylinders as adapted to illuminate the translucent plastic face of present day marquee-type advertising signs. This can be done by either placing the translucent plastic face of the sign a distance from the diverging beams of the light, or from the focus of the light, in both cases sufficient to enable it to be illuminated over its entire surface or, alternatively, by using a special lens which forms divergent beams, situated in front of the light source, and placing the translucent plastic sheet at the required distance from the lens so that its entire surface is illuminated.

The principal object and essence of my invention is therefore to provide a device of the character herewithin described which permits infinitely variable colours to illuminate either acrylic plastic forms or letters or rods, due to the light-pipe phenomenon or, alternatively, to illuminate a translucent plastic sheet face of a sign also by means of infinitely variable coloured light.

Another object of my invention is to provide a device of the character herewithin described which can be used either with incandescent or fluorescent lamps depending upon the circumstances.

Yet another object of my invention is to provide a device of the character herewithin described which is particularly adaptable for use with a 35 mm. or other size camera film which can be coated in varying colours and which facilitates the movement of the belts on spools similar to conventional movie camera sprockets.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a perspective view of the invention showing, as an example, the acrylic plastic rod formed in letters.

FIGURE 2 is a side sectional elevation of the device shown in FIGURE 1.

FIGURE 3 is a fragmentary sectional front elevation of FIGURE 2 taken along the line 3—3 of FIGURE 2.

FIGURE 4 is a partial perspective view showing one method of mounting the plurality of belts to produce the infinitely varying colours.

FIGURE 5 is a fragmentary sectional elevation showing an alternative method of mounting the belts.

FIGURE 6 is a perspective rear view of one of the letters shown in the sign illustrated in FIGURE 1.

FIGURE 7 is a side elevational view showing an alternative embodiment of the device particularly suitable for use in illuminating a translucent plastic face of a sign.

FIGURE 8 is a schematic view showing an alternative method to that illustrated in FIGURE 7.

FIGURE 9 is a fragmentary perspective view showing an example of the belt adapted to be operated by conventional movie camera type spools, the two runs of the belt being parallel to one another.

FIGURE 10 is a view similar to FIGURE 9, but showing the belt turning through 90 degrees.

FIGURE 11 is a partially schematic top plan view showing the device used with a single belt.

FIGURE 12 is a front elevation showing a further arrangement of my invention, the face plate being fragmented in part to show the interior thereof.

FIGURE 13 is a schematic view of the side elevation of a view similar to that of FIGURE 12, but showing an alternative belt arrangement.

FIGURE 14 is an enlarged fragmentary cross sectional view of an "aperture" fluorescent light tube showing the light emitting slit.

FIGURE 15 is an elevational view showing a double sided sign.

FIGURE 16 is a cross sectional schematic view showing a pair of concentrically rotating cylinders.

FIGURE 17 shows a fragmentary cross sectional elevation with the strips of colour situated horizontally along the cylinder.

FIGURE 18 is a view similar to FIGURE 17, but showing the strips of colour spirally wound.

FIGURE 19 is a side elevation partially in perspective showing a tip cap for the ends of the acrylic rods.

In the drawings like characters of reference indicate corresponding parts in the different figures.

Proceeding therefore to describe my invention in detail, reference should be made to the accompanying drawings in which I have shown an enclosure 10 adapted to contain the invention and to protect same from the effects of the elements.

This enclosure is provided with a front cover portion 11 upon which may be supported acrylic rods formed in the shape of letters 12. FIGURE 6 shows the letter O formed of a one length piece of acrylic rod, said rod terminating with the two longitudinal portions 13 which are adapted to be situated internally of the enclosure 10 and may be supported upon brackets 14 within the enclosure.

The front face 15 of the cover 11 acts as a mask and may be cut out so that just the outline of the letters shows therethrough as illustrated, or it may be perforated only where required to allow insertion of the tips, and I have found it desirable that the rear portions of the letters within the cover and not forming the letter itself, illustrated by the reference character 16, can be coated with vacuum deposited aluminum, or silver mirror backing, or a like completely reflective medium to improve the light-pipe transmission properties of the letters by preventing extraneous light from escaping.

I have also found it advantageous to paint rear portions of the rod actually forming the letter, with a reflective paint. I have found that by coating a portion of the circumference equal to the radius of the rod, the light emission purposes thereof are improved to a relatively large extent.

Within the enclosure 10 I have provided a source of light 17 which may take the form of a sealed beam light for each letter or, alternatively, any other convenient source which is commonly known.

This sealed beam light is connected to a source of electrical power (not illustrated) and is surrounded by a perforated enclosure 18 to support the lamp and lens and maintain both in alignment and at the same time permit circulation of air for cooling purposes.

At the front of the perforated enclosure 18, I provide a focusing lens of glass or plastic 19 which focuses the light beam in a convergent beam illustrated by reference character 20, the apex of which is the rear ends 21 of the aforementioned portions 13 of the acrylic plastic rod letter 12.

It is evident that the shorter the focal length of the lens employed, the more compact the arrangement, and the more light gathering properties are affected. In practice I have found an aspheric lens to be most useful, providing shortest relative focus.

This arrangement means that the light-pipe properties of the letter allow the light to funnel through the letter and illuminate the face of the letter.

The foregoing has been given in the illustrative sense only for the sake of clarity. An improvement embodied in a working model and shown in FIGURE 15, carries the same optical system and arrangement but the light source is directed vertically. The tips of the acrylic rods are curved downward, as at 13' to receive the light at the predetermined focus. The advantages of this are reduction of lateral bulk (width) and the feasibility of a double-sided sign. Tips of opposite letters, from each side, are curved downward to meet in the pool of light at or near the focus, both sides thus accepting light from the same source as illustrated in FIGURE 15.

It is desirable that each unit of acrylic rod be so shaped that its two ends are brought together to receive light from the same source, so that the rod forms in effect a closed circuit of light. In this manner the light, weakening progressively as it proceeds further from one tip, is reinforced by the light proceeding in the opposite direction from the other tip. Where configuration of the formed rod makes it impossible to bring the tips together, the principle can be maintained by introducing light from two separate sources into the two tips. In those cases where a tip is not exposed to a light source, a small mirror of suitable diameter and concavity may be placed at the tip to reflect back the escaping light, or the tip may be coated with a suitable reflective medium.

I have found also that the light receiving tips of all rods should be dished inwards (concave) as at 26' in FIGURE 16, to improve the light gathering qualities and more important, to break up any possible collimation of the light rays. The tangent to the arc forming the concavity, must make an angle of less than 6° with the extension of the chord of the arc. To illustrate, maximum degree of concavity for the tip of a rod of ⅝-inch diameter, is an arc of 3-inch radius. The more random the paths of the rays, the more reflectance obtained per given amount of light. All tips are buffed (polished) to optimum smoothness for maximum penetration of light.

Situated within the enclosure 10 is a plurality of colour producing belts and reference should first be made to FIGURES 2, 3 and 4.

I have provided two belts 22 and 23 situated one within the other and being routed around corner rollers 24 and 25 respectively so that the front runs 22' and 23' pass in front of the lens 19 and the rear runs 22" and 23" pass behind the light source 17. Both of these belts rotate horizontally and may be driven by a source of power (not illustrated). Due to the fact that the inner belt travels a shorter distance than the outer belt, it will be appreciated that if they are both driven from a common source of power, the difference in linear speed will be slight so that the inner belt is always travelling slightly faster than the outer belt.

These belts are made preferably of transparent coloured plastic in segments 26 so that each segment is of a different colour.

Due to the fact that the belts are travelling at different speeds, an infinitely variable blend of colours is produced by the light beam passing through the two front runs of the belts and thus entering the tips 21 of the acrylic rods 13.

FIGURE 5 shows an alternative construction, once again using two belts running around rollers 24 and 25 situated one within the other but in this instance, the belts are adapted to rotate vertically around the light source as clearly shown in FIGURE 5.

In both instances, tension spring 27 may be utilized on two of the corner rollers 24 and 25 in order to maintain the required tension upon the belts 22 and 23.

FIGURE 11 shows another alternative in which one continuous belt travels horizontally between two rollers, the light passing through both sides as they move in opposite directions.

However, I prefer to use commercially available 35 mm. or 70 mm. film for the belts mainly because such film is perforated on the edges and adapted to be rotated around sprockets and such routing gives far greater flexibility of use as well as eliminating the possibility of slippage occurring.

Furthermore, this type of cellulose acetate film can be coloured by painting transparent colours on adjacent segments of the untreated film, or by using exposed and developed colour film of any subject matter as same will be out of focus, or alternatively exposing and developing raw film for special colour effects.

However, such film is not illustrated as the description of same is believed to be well known by those skilled in the art.

FIGURE 16 shows an alternative to the use of belts and illustrates, schematically, a pair of clear plastic cylinders 50 and 51, one concentric and rotating within the other, the concentrically rotating cylinders either singly or in multiple units as required, being of a length sufficient to encompass the entire distance between the tips of the outside letters or limits of the sign. Each cylinder has one half of the circumference coloured along its length, generally with a plurality of colours, the number and segment of arc of which is optional. These colours are indicated by the reference characters 52, 52' and 52". The other half circumference is left clear as indicated by the reference character 53. It is obvious that if the cylinders are rotated one with the other, by conventional means, at incrementally different speeds, the light beam transmitted through the diameter will present at the acrylic rod tips 13, infinitely variable colours, and only two colour media will be transmitted at any given time.

I have found that a clear thermosetting plastic marketed under the trade name "Homalite" is very suitable for the cylinders as it is very fire resistant, extremely tough and durable.

Differential rotation of the cylinders is accomplished by use of sprockets, rim drive, use of the Geneva movement, or other methods well known to those skilled in the art.

It is evident that if the pair or pairs of rotating cylinders is located so that their common axis is parallel to a straight line through all tips, colours on the circumferences, if running parallel to the axis, will result in all tips receiving the same colour at the same time. This arrangement of colours is illustrated in FIGURE 17, although for illustrative purposes, the width of the colour bands has been compressed.

On the other hand, if the various colours are emplaced in bands running spirally around the circumference, as shown in FIGURE 18, it is obvious that all tips will receive different colours at any given moment. The colours will not only be infinitely variable, but also infinitely variable in the sequence of presentation to the tips, both depending on the difference in speed of the two cylinders combined with the angle of the spiral of the colour bands. Once again the schematic representation of the cylinder in FIGURE 18 has been compressed vertically for clarity.

If, for any particular purpose, it is desired that the sign be of one static colour or of unchanging different colours, belts, cylinders, or other method of changing colours may be dispensed with, and in substitution, small metal caps 54 of a diameter to form a press fit over the tips 13 of the acrylic rods, may be used. Each metal cap has a narrow flange 55 approximately 1/32-inch wide, forming a retainer rim at the outermost end, sufficient to hold in place a die cut round segment of transparent filter 56 of the desired colour. The cap is fitted over the tip so that the filter is in intimate contact with the face of the tip. There is, of course, a corresponding reduction in cost under these circumstances.

FIGURES 7 and 8 show the invention particularly suited for use for illumination of the well known marquee type translucent white plastic signs which include a front translucent plastic sheet 28. The light source and lens are similar to those hereinbefore described and in FIGURE 7 it will be seen that the lens focuses the light beam, through the plurality of colour film strips or belts 22 and 23, in form of a converging beam having its apex at 29. An aperture in the back panel 30 of the box-like sign 31 permits the light to pass through and the beam expands to strike the rear of the front face 28 thus illuminating same also with an infinitely variable colour effect.

FIGURE 8 shows an alternative construction consisting of a fluorescent lamp tube 32 having a parabolic reflector 33 situated therebehind thus sending a substantially parallel light beam through the belts or filmstrips 22 and 23 and thence through a double concave or planar concave lens made either of glass for individual cases or, alternatively, an extruded plastic lens in continuous length which in turn causes the light beam to diverge outwardly and strike the translucent white plastic face 28 of the sign thus illuminating same over its entire surface and once again with infinitely changeable colouring.

It will be appreciated that any previous method for the arrangement of belts 22 and 23 may be utilized with the embodiments shown in FIGURES 7 and 8 including the above discussed coloured 35 mm. movie film or the equivalent.

FIGURES 9 and 10 show the aforementioned belts adapted to be utilized with conventional movie camera type sprockets 32' mounted upon spindles 33'. These sprockets contain extending pins 34 adapted to engage apertures 35 formed along the edges 36 of the film strips or belts.

FIGURE 9 shows the arrangement whereby the upper and lower runs of the belt are parallel to one another whereas FIGURE 10 shows a change in direction through 90°.

FIGURES 12, 13 and 14 show a further arrangement of the invention, in which I have provided a plurality of vertically situated acrylic rods 37. These rods are situated in the same plane and in parallel spaced apart relationship and are covered by a masking plate 38 having the desired letter or design cut out therefrom. The present example shown in FIGURE 12, the letter N, 39 is shown. A pair of fluorescent tubes 40 are mounted at both ends of the rods 37 and an endless belt or strip 41 is routed around sprockets 42 situated in each corner of the enclosure 43, one sprocket being adapted to drive the belt in the conventional manner (not illustrated).

The belt or strip 41 is formed similar to the belts or strips hereinbefore described with coloured segments and the upper and lower runs 43 and 44 respectively, pass between the light source 40 and the ends 45 and 46 of the rods 37 respectively. This causes an infinitely variable colour change to appear in the portions of the rods showing through the cut out of the masking plate 36.

If it is desired to have all of the rods change colour at the same time, then the belt arrangement shown schematically in FIGURE 13 should be utilized and it will be appreciated that the belt or strip 41 shown in FIGURE 13 is of a width sufficient to span all of the ends 45 and 46 of the rods 37. By spacing the colour segments accurately and by designing the diameters of the sprockets 42, the same colour segment can be made to pass both the upper and lower ends of the rods at the same time.

It will be noted that the ends of the rods are curved back through 180 degrees to receive the light from the fluorescent lamps 40 mounted inside the tips. The reason for this arrangement is the fact that collimated light (parallel rays) is much less reflective when passing through straight rod. It is overcome by placing a return curved at each end which breaks up any collimation, produces scatter in the rays as they bounce at unequal angles off the walls of the rod around the curve, and remain scattered along the straight length of the rod, thus materially increasing the reflection of the painted rear walls of the rods forming the letter.

FIGURE 14 shows the preferred type of fluorescent lamp 40 in which the majority of the inner surface is covered by a reflective paint or similar means 48 with the exception of a light emitting slit 49 which extends the full length of the fluorescent tube immediately adjacent the ends 45 and 46 of the rods 37. This type of "slit aperture" lamp is now available commercially.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

In an illuminated display apparatus, the combination of a housing having an opaque front wall provided with a linear opening conforming to the outline of a character to be displayed, a display character comprising a single light transmitting rod, said rod having an intermediate region configurated to the character outline and mounted complementally in said linear opening with all portions of said intermediate region being substantially coplanar with said front wall, portions of said rod continuing from said intermediate region extending into said housing in mutually convergent relation and terminating in a pair of straight end portions disposed in juxtaposed contacting parallelism normal to the plane of said front wall, said straight end portions having rearwardly facing end surfaces, a source of light provided in said housing rearwardly from but in optical alignment with said end portions of said rod, and lens means in the housing forwardly of said source of light for focusing light rays therefrom onto said end surfaces of said rod end portions.

References Cited by the Examiner

UNITED STATES PATENTS

| | | | |
|---|---|---|---|
| 1,004,671 | 10/11 | Miller | 40—132 |
| 1,351,562 | 8/20 | Foster | 240—10.1 |
| 1,964,591 | 6/34 | Nanfeldt | 240—10.1 |
| 2,126,729 | 8/38 | Bugge | 40—132 |
| 2,293,185 | 8/42 | Wolfson | 40—77 |
| 2,448,244 | 8/48 | Arnold | 40—130 |
| 2,531,937 | 11/50 | Gratiot | 40—130 |
| 2,646,637 | 7/53 | Niesenberg et al. | 240—1 |
| 2,689,948 | 9/54 | Rothman | 240—1 |
| 2,843,002 | 7/58 | Allison | 40—130 |
| 3,137,447 | 6/64 | Dorman | 240—1 |

NORTON ANSHER, *Primary Examiner.*

LAWRENCE CHARLES, *Examiner.*